United States Patent [19]
Hansen

[11] 3,864,109
[45] Feb. 4, 1975

[54] AIR FILTER

[75] Inventor: Erik J. Hansen, Ann Arbor, Mich.

[73] Assignee: Inter-Nation Research Corporation, Ann Arbor, Mich.

[22] Filed: June 26, 1974

[21] Appl. No.: 483,396

Related U.S. Application Data

[60] Division of Ser. No. 329,116, Feb. 2, 1973, , which is a continuation-in-part of Ser. No. 73,714, Sept. 21, 1970, abandoned.

[52] U.S. Cl.......................... 55/324, 55/337, 55/484
[51] Int. Cl............................................. B01d 50/00
[58] Field of Search ............ 55/323, 337, 324, 482, 55/484, 510, 529, 385

[56] References Cited
UNITED STATES PATENTS
2,338,346   1/1944   Mather ................................. 55/484

FOREIGN PATENTS OR APPLICATIONS
560,123   3/1944   Great Britain ........................ 55/482
882,647   11/1961   Great Britain ........................ 55/482

Primary Examiner—Bernard Nozick

[57] ABSTRACT

An air filter for use with internal combustion engines is constructed which comprises a housing having an air inlet and a filtered air outlet, a plurality of filter elements placed one atop the other inside the housing and means for conveying filtered air to the engine.

4 Claims, 12 Drawing Figures

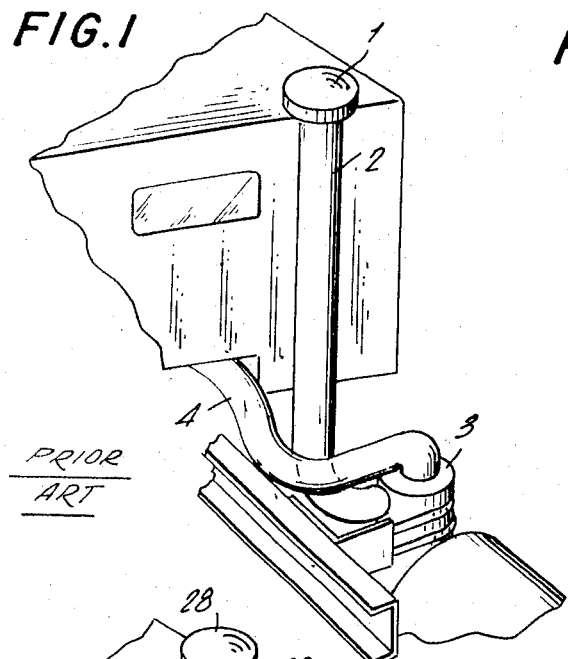
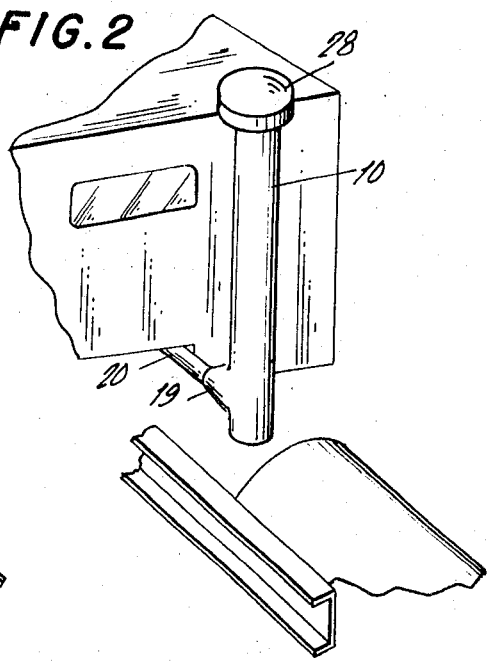
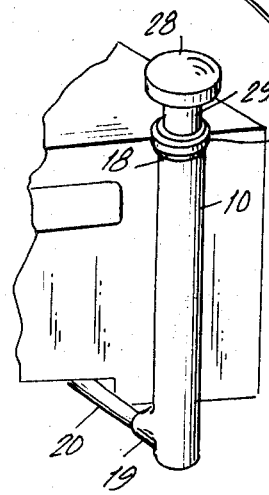
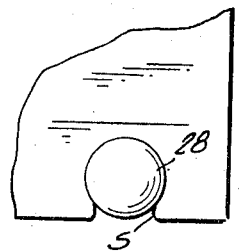
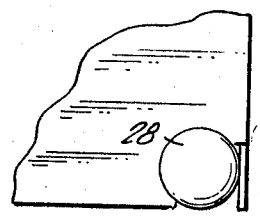
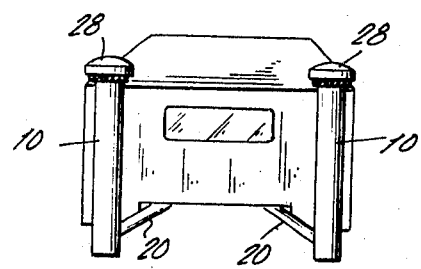
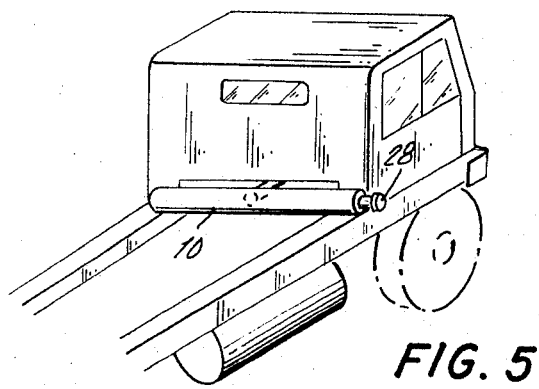

AIR FILTER

This is a division of application Ser. No. 329,116 filed Feb. 2, 1973, which is a cont.in.part of Ser. No. 73,714, filed Sept. 21, 1970 now abandoned.

Application Serial No. 73,714 is concerned with air filtration devices for filtering air which is drawn in and fed to the manifold of an internal combustion engine. FIG. 1 of that application shows a typical prior art device.

The present invention constitutes an improvement not only over the prior art but over the device of Ser. No. 73,714. The air filter of the present invention has particular utility for use on heavy duty trucks and equipment, which vehicles generally have a tall, vertically mounted, air-intake pipe which protrudes above or extends beyond the dimensions of the truck cab for the purpose of drawing air down into the filter canister where it is filtered and passes through the air intake to the engine. According to the prior art, air is drawn in through an air-intake tube, passed through a separate air cleaner, for example, a dry type filter air canister or air-oil bath type which may be of a canister shape, and thereafter filtered air passes out from this air filter and is conveyed to the engine (See FIG. 1). The air cleaners are generally mounted on the chassis and thus occupy valuable space. These air-filter-canister cleaners require cleaning and/or changing every 10,000 to 100,000 miles. This service frequency means that the truck involved is withdrawn from usage with a high degree of frequency. In addition, the pulling of air to the engine through the filtering device results in a loss of power and an increase of engine wear. By currently accepted measuring techniques, known air filtration systems exhibit up to 18 inches of water restriction from pulling air to the engine.

The present invention has resulted from the desire to reduce the maintenance frequency, to reduce engine wear, to reduce the power loss and to eliminate the space requirements for air filtering devices whereby the space can be used to increase the fuel carrying capacity or the load carrying capacity.

The present invention, by utilizing an air-intake tube as the housing for the filtering means, overcomes all the above disadvantages. This structural change results not only in eliminating the necessity of having a separate air cleaner mounted on the chassis of the vehicle but also enables power loss to be minimized and the filter life to be increased up to 300,000 to 1,500,000 miles between servicing intervals.

According to the present invention, the diameter of the air-intake tube and the shape, if desired, is adjusted in order to accommodate a filter medium. Air is drawn into the housing through the air-intake tube through the filter medium, out the filtered air outlet and then conveyed directly into the engine. This air filter can have mounted thereon an air pre-cleaner which would serve the effect of further increasing the life of the filter medium.

According to this invention, greater flexibility is present for the positioning and location of the air filter. Thus, for example, the air-filter means could be mounted horizontally (see FIG. 5) instead of vertically, or could be placed in a suitable molded area of a truck cab (see FIGS. 4A and 4B) whereby less space would be taken up by the air-filtration device.

According to the present invention, the housing can have a variety of configurations of which a cylindrical configuration is illustrated and a variety of filter media can be used. The operation and advantages of the present invention can be more fully appreciated by reference to the drawings wherein:

FIG. 1 shows a device according to the prior art;
FIG. 2 shows a device according to the present invention;
FIG. 3 shows a device according to the present invention having an air pre-cleaner attached thereto;
FIG. 4A shows a plan view of the present invention which is disposed through a molded section of the cab of a truck;
FIG. 4B is similar to FIG. 4A but shows the present invention as an integral part of the truck cab;
FIG. 4C is similar to FIG. 2 but shows a pair of devices;
FIG. 5 shows a device according to the present invention mounted horizontally;
FIG. 6 shows a sectional view of the air filter and the filtering means;
FIG. 7 shows the filter of FIG. 6 with an air pre-cleaner attached;
FIG. 8A shows a further embodiment of the present invention wherein the air flows from the outside of the filter into the center portion thereof;
FIG. 8B shows the embodiment of FIG. 8A attached to a truck; and
FIG. 9 shows a detailed view of an air-filter-cartridge end cap with spacer tabs.

Turning with particular reference to the drawings, FIG. 1 shows an air-intake tube 2 according to the prior art having a "rain-hat" 1 atop the air-inlet tube, which tube conveys air drawn in from the environment into a canister-type air cleaner 3 wherein the air is filtered by a dry filter cartridge and conveyed through engine-intake manifold pipe 4 to the engine of the vehicle. According to the present invention, air-cleaner canister and filter 3 and its mounting brackets and a portion of the conveying pipe 4, as well as a portion of the air-intake tube, are eliminated. The present invention is most clearly shown in FIGS. 2, 6, 7 8A and 8B. My air filter comprises a housing 10 of substantially cylindrical shape having a closed bottom. The bottom may be closed either by integral formation or by means of bottom plate 11 having side flanges 13 and gasket 12. The top of housing 10 is open. A top cover 14 having a centrally disposed opening therethrough 15 is secured to the housing such as by gaskets 16, bolts 17 and "U-ring" 18. The housing 10 has through a side wall a filtered air outlet 19 having a pipe or hose 20 which carries the filter air into the engine manifold pipe. A plurality of filter cartridges 21 preferably of cylindrical shape and having a diameter smaller than that of housing 10 are disposed one atop the other inside housing 10. Adjacent filter cartridges are preferably secured to one another and spaced equidistantly from the interior walls of the housing 10 by filter cartridge end caps having spanners 22. Suitable gaskets 23 may be used in securing adjacent filter cartridges. Filter cartridges 21 are illustrated with an open central portion 24 through which air to be filtered passes and has perforated steel or other suitable material perforated inner and outer cartridge liners 25 and 26 which act as the filter material.

The air to be filtered is drawn into housing 10 through intake tube 27, the bottom portion of which extends through opening 15 in cover 14 and into the central portion of the uppermost filter cartridge. The other end of intake tube 27 extends upward and either contacts "rain-hat" 28 or extends into the interior of air pre-cleaner 29. In each case the upper portion of intake tube 27 is secured, in the one case to cap 28 and in the other case to air pre-cleaner 29. Air pre-cleaner 29 is an optional feature. Conventional known air pre-cleaners can be used. These may or may not be aspirated.

FIG. 4A shows a plan view of the air filter wherein housing 10 is disposed through a hollowed molded section S in the cab of the truck which further conserves space, thus making additional space on the truck chassis available.

FIG. 4B shows a plan view of my air filter as an integral part of the truck cab.

FIG. 4C shows a pair of my air filters.

FIG. 5 shows an alternative arrangement of the invention wherein instead of a vertical installation, the device is installed horizontally so that in the case of the device having the air pre-cleaner 29, both the air pre-cleaner 29 and cap 28 extend beyond the side dimension of the cab while housing 10 containing the filters 21 is located at a position near the bottom portion of the cab.

Figure 6:
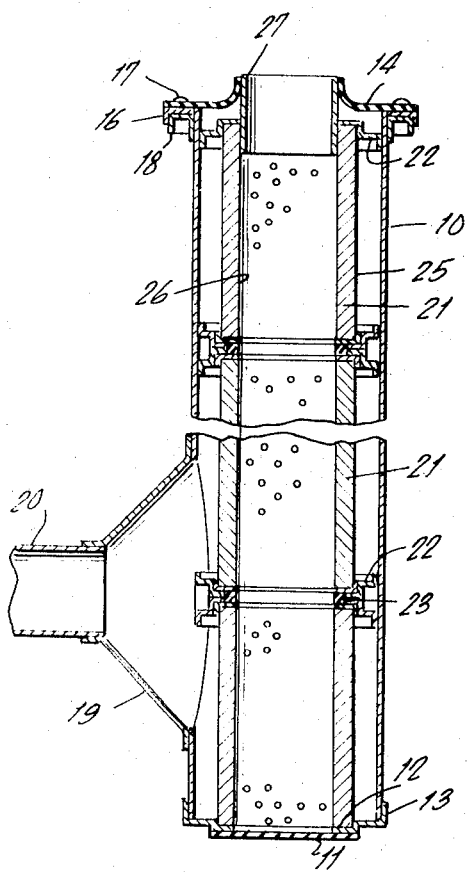
Figure 7:
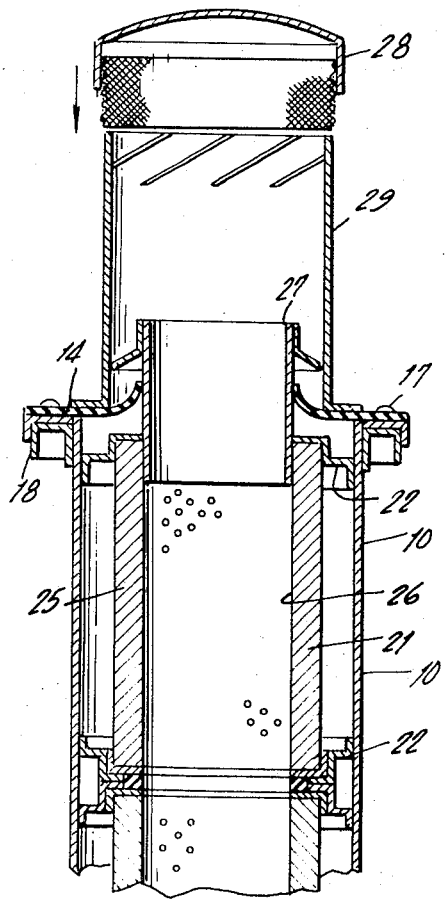
Figure 8B:
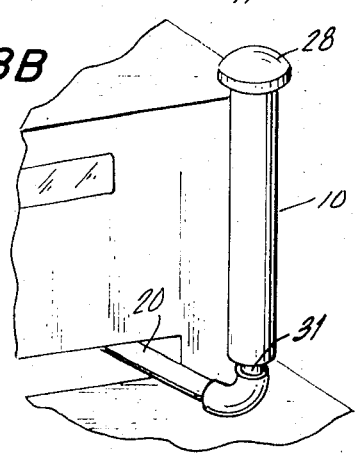
Figure 9:
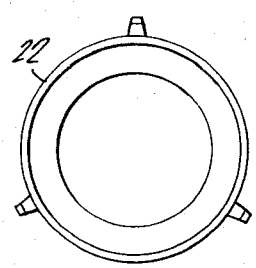
Figure 8A:
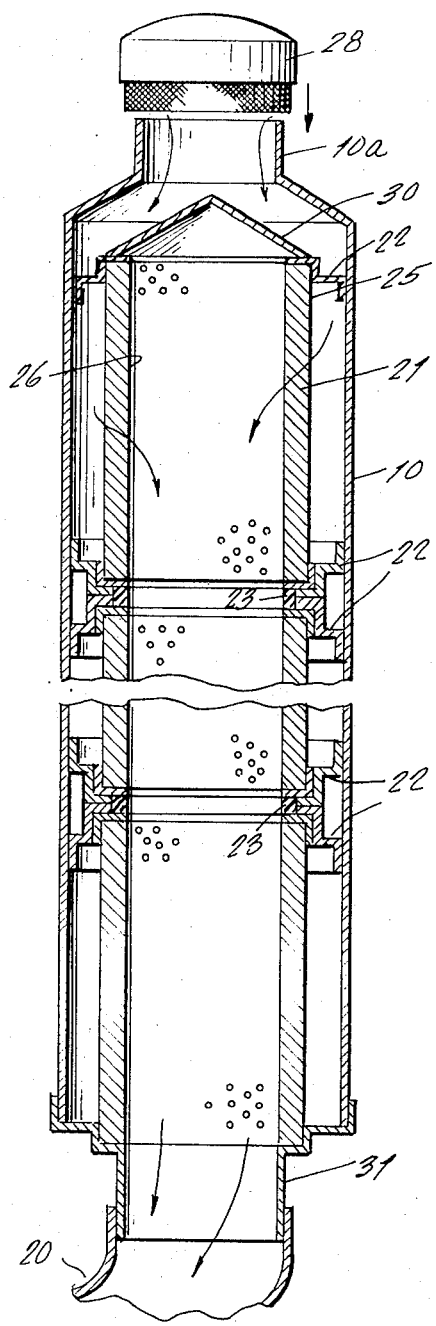

FIG. 8A shows an alternative structure according to my invention. Here housing 10 has an integral mouth 10a through which air is drawn. Cone 30 deflects the air to the outer portion of the filter cartridges and the air then passes through the filter cartridges 21 into the interior of the cartridges. From there, the filtered air is drawn downward through filtered air outlet 31 and through the intake manifold pipe to the engine.

FIG. 8B shows the embodiment of FIG. 8A mounted on a truck cab.

Other and further modifications and embodiments of the present invention will be more fully appreciated by those skilled in the art with reference to the foregoing specification, the drawings and claims appended hereto.

What is claimed is:

1. An air filter for use with internal combustion engines which comprises a substantially cylindrical housing, the top portion of which terminates in an air-inlet portion, a filtered air outlet disposed through the bottom of said housing, a plurality of filter elements having a central opening and a perforated cover placed one atop the other inside the housing, said filter elements being substantially equidistantly spaced from the interior cylindrical walls of the housing and means for deflecting air around the filter elements and means for covering the central opening in the uppermost filter element.

2. An air filter according to claim 1 wherein the filter elements are substantially cylindrical filter cartridges.

3. An air filter according to claim 2 wherein adjacent filter cartridges are secured to one another.

4. An air filter according to claim 3 which comprises a "rain-hat" secured to the air inlet portion.

* * * * *